US012393218B2

(12) United States Patent
Choi et al.

(10) Patent No.: US 12,393,218 B2
(45) Date of Patent: Aug. 19, 2025

(54) SWITCH CONTROL VOLTAGE GENERATOR, BANDGAP REFERENCE GENERATOR, AND METHOD FOR GENERATING SWITCH VOLTAGE THEREOF

(71) Applicant: Samsung Electronics Co., Ltd., Suwon-si (KR)

(72) Inventors: Haejung Choi, Suwon-si (KR); Jooseong Kim, Suwon-si (KR); Junhyeok Yang, Suwon-si (KR); Sungmin Yoo, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/412,844

(22) Filed: Jan. 15, 2024

(65) Prior Publication Data

US 2025/0021122 A1 Jan. 16, 2025

(30) Foreign Application Priority Data

Jul. 12, 2023 (KR) ........................ 10-2023-0090436

(51) Int. Cl.
*G05F 3/20* (2006.01)
*G05F 1/567* (2006.01)
*G05F 3/26* (2006.01)

(52) U.S. Cl.
CPC .............. *G05F 3/205* (2013.01); *G05F 1/567* (2013.01); *G05F 3/267* (2013.01)

(58) Field of Classification Search
None
See application file for complete search history.

(56) References Cited

U.S. PATENT DOCUMENTS

| | | | | |
|---|---|---|---|---|
| 8,269,550 | B2 * | 9/2012 | Jurasek | G05F 1/567 327/512 |
| 9,859,848 | B2 | 1/2018 | Choo et al. | |
| 10,216,213 | B2 * | 2/2019 | Chu | G11C 5/14 |
| 10,659,026 | B2 * | 5/2020 | Minami | G05F 3/225 |
| 2007/0252573 | A1 | 11/2007 | Tachibana et al. | |
| 2008/0059110 | A1 | 3/2008 | Fujisawa et al. | |
| 2010/0111137 | A1 | 5/2010 | Chen et al. | |

(Continued)

OTHER PUBLICATIONS

Extended European Search Report dated Nov. 15, 2024 for corresponding European Application No. 24179156.5.

*Primary Examiner* — Jeffrey S Zweizig
(74) *Attorney, Agent, or Firm* — Harness, Dickey & Pierce, P.L.C.

(57) ABSTRACT

A semiconductor device including a bandgap reference generator that generates a reference voltage; a switch control voltage generator that generates a first reference current based on the reference voltage, and generates an adaptive switch level voltage by distributing the first reference current to a first path and a second path, the first path including a first resistor, and the second path including a second resistor and a first bipolar junction transistor connected in series; and a switch controller that generates a switch control signal for controlling switches included in the bandgap reference generator based on the adaptive switch level voltage. The adaptive switch level voltage has a slope with respect to temperature that is greater than a base-emitter voltage of the first bipolar junction transistor.

20 Claims, 14 Drawing Sheets

(56) References Cited

U.S. PATENT DOCUMENTS

| | | | |
|---|---|---|---|
| 2010/0295529 | A1 | 11/2010 | Consoer |
| 2016/0161971 | A1 | 6/2016 | Fukazawa et al. |
| 2016/0246317 | A1 | 8/2016 | Song et al. |
| 2016/0334816 | A1 | 11/2016 | Ji |
| 2019/0123729 | A1 | 4/2019 | Minami |
| 2020/0042668 | A1 | 2/2020 | Peng et al. |
| 2023/0009763 | A1 | 1/2023 | Wang et al. |

* cited by examiner

154

SWITCH CONTROL VOLTAGE GENERATOR, BANDGAP REFERENCE GENERATOR, AND METHOD FOR GENERATING SWITCH VOLTAGE THEREOF

CROSS-REFERENCE TO RELATED APPLICATIONS

This application claims priority under 35 U.S.C. § 119 to Korean Patent Application No. 10-2023-0090436 filed on Jul. 12, 2023 in the Korean Intellectual Property Office, the disclosure of which is incorporated by reference herein in its entirety.

BACKGROUND

Embodiments of the present disclosure relate to semiconductor devices, and more particularly, to a switch control voltage generator, a bandgap reference generator, and a switch voltage generation method thereof.

Due to the development of fine processes, it is becoming possible to integrate more devices per unit area in a semiconductor chip. Performance improvement of semiconductor chips is also accelerating. Due to improved performance and reduced line width, heat generated from semiconductor devices has a great influence on device stability. Therefore, generating a reference voltage that is stable with respect to temperature has become a means for ensuring the performance or reliability of semiconductor devices.

A reference voltage of a semiconductor device is generally generated using a bandgap reference BGR circuit. As the advanced processes progress, process issues such as Bipolar Junction Transistor BJT dispersion, leakage current, and contact resistance have an increasing effect on the accuracy of the BGR circuit. To optimize the accuracy of the BGR circuit in such an environment, techniques such as trimming or chopping are applied. Trimming or chopping of the BGR circuit is performed using the turn-on/turn-off action of a switch connected to a BJT. However, control of the switch in a low-voltage environment according to miniaturization of the processes has become an increasingly difficult problem.

SUMMARY

Example embodiments of the inventive concepts provide a switch voltage generation circuit and a voltage generation method capable of increasing switching accuracy of switches controlling a bandgap reference BGR circuit even under miniaturization and low voltage conditions. Example embodiments of the inventive concepts further provide a bandgap reference generator capable of improving reliability of a reference voltage based on high switching accuracy.

Example embodiments of the inventive concepts provide a semiconductor device that includes a bandgap reference generator that generates a reference voltage; a switch control voltage generator that generates a first reference current based on the reference voltage, and generates an adaptive switch level voltage by distributing the first reference current to a first path and a second path, the first path including a first resistor, and the second path including a second resistor and a first bipolar junction transistor connected in series; and a switch controller that generates a switch control signal for controlling switches included in the bandgap reference generator based on the adaptive switch level voltage. The adaptive switch level voltage has a slope with respect to temperature that is greater than a base-emitter voltage of the first bipolar junction transistor.

Example embodiments of the inventive concepts further provide a switch control voltage generator that includes a first current source connected to a power supply voltage, the first current source transfers a first reference current having a constant level with respect to temperature to the first node; a first resistor connected between the first node and ground; a second resistor having one end connected to the first node; and a diode-connected bipolar junction transistor connected between another end of the second resistor and ground. The first resistor, the second resistor and the diode-connected bipolar junction transistor generate an adaptive switch level voltage at the first node, a magnitude of a slope and an offset of the adaptive switch level control voltage with respect to temperature adjustable based on resistances of the first and second resistors.

Example embodiments of the inventive concepts still further provide a method for generating a switch voltage for switching of a bandgap reference generator that includes generating a reference current based on a reference voltage provided from the bandgap reference generator; generating an adaptive switch level voltage by distributing the reference current to a first path and a second path, the first path including a first resistor, and the second path including a second resistor and a diode-connected bipolar junction transistor connected in series; generating a switch control signal for controlling switch elements of the bandgap reference generator based on the adaptive switch level voltage; and applying the switch control signal to the switch elements of the bandgap reference generator.

BRIEF DESCRIPTION OF THE FIGURES

The above and other objects and features of the present disclosure will become apparent in view of description of example embodiments thereof with reference to the accompanying drawings.

DETAILED DESCRIPTION

Figure 1:
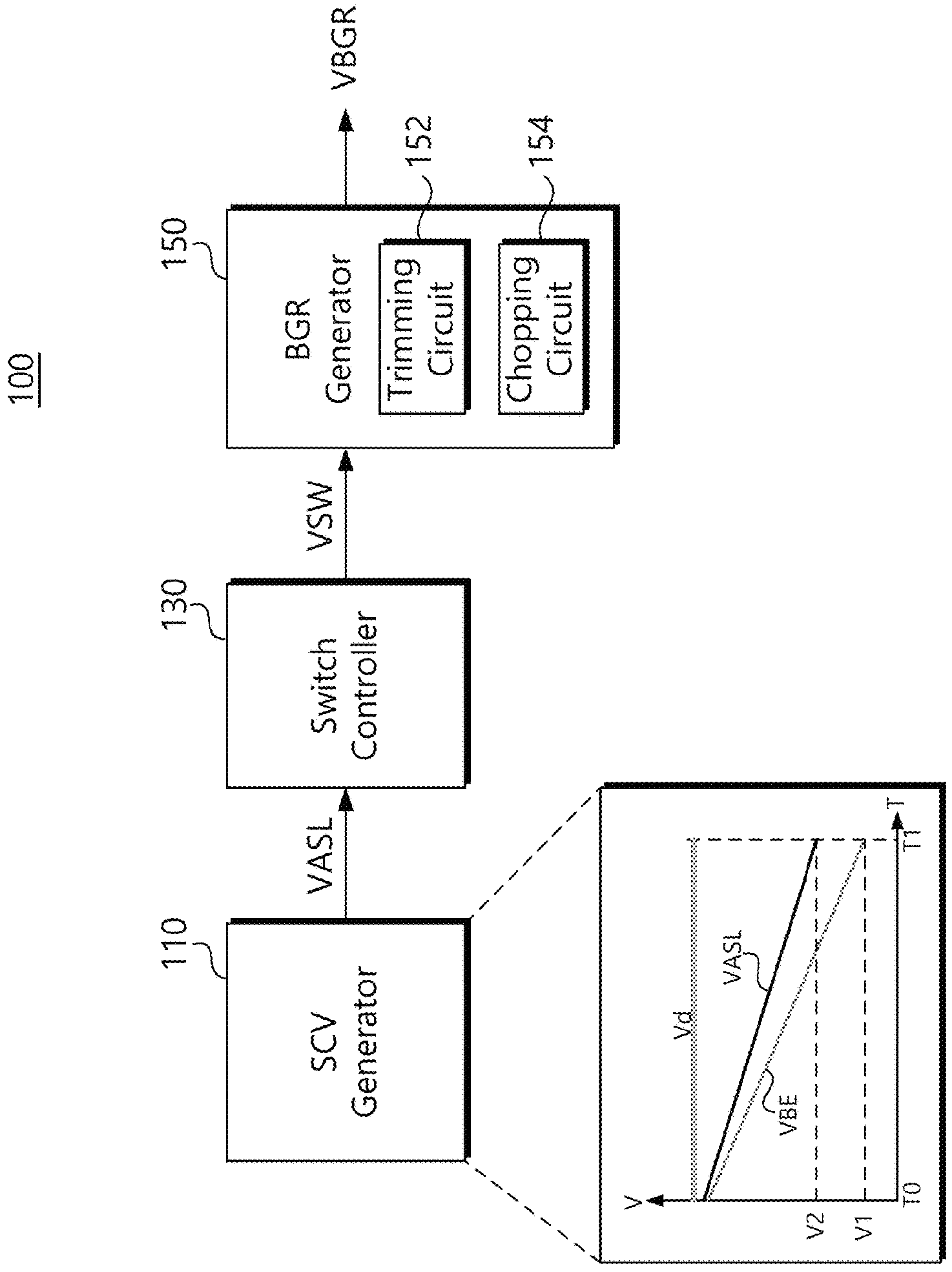
FIG. 1 is a block diagram illustrating a semiconductor device including a switch control voltage generator according to some example embodiments of the inventive concepts.

It is to be understood that both the foregoing general description and the following detailed description correspond to example embodiments. Wherever possible, the same reference numerals and characters are used in the description and drawings to refer to the same or like parts.

When the terms "about" or "substantially" are used in this specification in connection with a numerical value, it is intended that the associated numerical value includes a manufacturing or operational tolerance (e.g., ±10%) around the stated numerical value. Moreover, when the words "generally" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes. When ranges are specified, the range includes all values therebetween such as increments of 0.1%.

Also, for example, "at least one of A, B, and C" and similar language (e.g., "at least one selected from the group consisting of A, B, and C") may be construed as A only, B only, C only, or any combination of two or more of A, B, and C, such as, for instance, ABC, AB, BC, and AC.

In the following, advantages of the inventive concepts will be explained using a bandgap reference BGR generator using a bipolar junction transistor BJT as an example. The switch of the trimming circuit or chopping circuit used to increase the accuracy of the bandgap reference generator will be described using a PMOS transistor as an example. However, those skilled in the art will readily appreciate other advantages and capabilities of the inventive concepts in light of the teachings herein. The inventive concepts may be implemented or applied through other embodiments. The detailed description may be modified or changed according to viewpoints and applications without significantly departing from the scope, spirit, and other objectives of the inventive concepts.

FIG. 1 is a block diagram illustrating a semiconductor device including a switch control voltage generator according to some example embodiment of the inventive concept. Referring to FIG. 1, a semiconductor device 100 may include a switch control voltage generator 110, a switch controller 130, and a bandgap reference generator 150.

The switch control voltage generator 110 generates an adaptive switch level voltage VASL for ensuring or improving reliability of the bandgap reference generator 150. For example, the switch control voltage generator 110 generates the adaptive switch level voltage VASL for trimming or chopping of the bandgap reference generator 150. Trimming or chopping of the bandgap reference generator 150 is performed through switching of low voltage transistors. Therefore, the switch control voltage provided to the bandgap reference generator 150 must be able to reduce the leakage current of the low voltage transistors at a specific temperature. The switch control voltage must be able to provide turn-on reliability of the low-voltage transistors at other specified temperatures. To this end, the switch control voltage generator 110 generates a voltage close to the base-emitter voltage VBE of a bipolar junction transistor (e.g., a BJT) at a low temperature (e.g., T0), and generates a voltage higher than the base-emitter voltage VBE at a high temperature (e.g., T1). That is, the switch control voltage generator 110 may generate an adaptive switch level voltage VASL according to temperature.

According to the characteristics of the switch control voltage generator 110, as shown in FIG. 1, the adaptive switch level voltage VASL is lower than the withstand voltage Vd of the switch transistor and close to the base-emitter voltage VBE at a low temperature (T0, for example, about −55° C.). On the other hand, at a high temperature (T1, for example, about 150° C.), the adaptive switch level voltage VASL may be generated at a level V2 higher than the level V1 of the base-emitter voltage VBE. Therefore, if the adaptive switch level voltage VASL is used, it is higher than the threshold voltage of the low voltage switch implemented with the PMOS transistor even at a low temperature (T0), thereby limiting or preventing the turn-off failure problem. Even at a high temperature (T1), when the adaptive switch level voltage VASL is applied, it is possible to cut off the low voltage switch implemented with a PMOS transistor without leakage current.

The switch controller 130 controls switch transistors of the bandgap reference generator 150 using an adaptive switch level voltage VASL. For example, the switch controller 130 generates switch control voltages VSW of low voltage transistors for trimming or chopping of the bandgap reference generator 150. The switch controller 130 generates a switch control voltage VSW for controlling the trimming circuit 152 of the bandgap reference generator 150 using the adaptive switch level voltage VASL. That is, the switch controller 130 turns on or turns off the low voltage transistors that determine the size of the resistance in the trimming circuit 152 using the switch control voltage VSW generated based on the adaptive switch level voltage VASL. The switch controller 130 may control the chopping circuit 154 of the bandgap reference generator 150 using the switch control voltage VSW generated based on the adaptive switch level voltage VASL. That is, the switch controller 130 may perform switching of the switches of the chopping circuit 154 based on the adaptive switch level voltage VASL.

The bandgap reference generator 150 may be a circuit that generates a bandgap reference voltage VBGR. The bandgap reference voltage VBGR may be used as a reference voltage for various functional blocks of the semiconductor device 100. The bandgap reference voltage VBGR may be used as a reference voltage used in analog circuits or digital circuits. For example, the bandgap reference voltage VBGR may be provided as a reference voltage to an analog circuit such as a comparator.

When the reference voltage is different from the intended value at the time of design, the semiconductor device 100 may malfunction or output an incorrect data signal. In order to ensure operational reliability of the semiconductor device 100, the bandgap reference generator 150 must have robustness to external factors (e.g., temperature change, noise, leakage current, etc.). That is, the bandgap reference generator 150 may be required to generate a reference voltage that is process-voltage-temperature PVT insensitive.

The bandgap reference generator 150 of the inventive concepts includes the trimming circuit 152 and the chopping circuit 154 that are switched by a switch control voltage VSW provided from the switch controller 130. The bandgap reference generator 150 may generate a highly accurate bandgap reference voltage VBGR using the trimming circuit 152 and the chopping circuit 154. The trimming circuit 152 may trim the emitter current according to the switch control voltage VSW. In some example embodiments, since the switch control voltage VSW becomes higher than the base-emitter voltage VBE at high temperatures, leakage current generated from the low voltage switch that is turned off may be blocked. Accordingly, the deterioration of the distribution of the bandgap reference voltage VBGR due to the leakage current of the switch transistor of the bandgap reference generator 150 may be improved.

The switch control voltage VSW may also be used in the chopping circuit 154 of the bandgap reference generator 150. The chopping circuit 154 is a circuit for removing an offset by cross-switching a differential signal at an input terminal or inside of an amplifier (not shown). For example, the switch control voltage VSW of the inventive concepts may be used to control the low voltage switches constituting the chopping circuit 154. In some example embodiments, turn-off failure of the low voltage switch can be limited or prevented even at a low temperature TO in which the voltage level is relatively lowered compared to the high temperature. Therefore, the offset removal effect of the chopping circuit 154 switched using the switch control voltage VSW can be guaranteed. As a result, reliability of the bandgap reference generator 150 may be improved.

The semiconductor device 100 described above may control the switches of the bandgap reference generator 150 using the adaptive switch level voltage VASL generated by the switch control voltage generator 110. Accordingly, it is possible to implement the bandgap reference generator 150 that supplies a highly reliable bandgap reference voltage VBGR.

Figure 2:
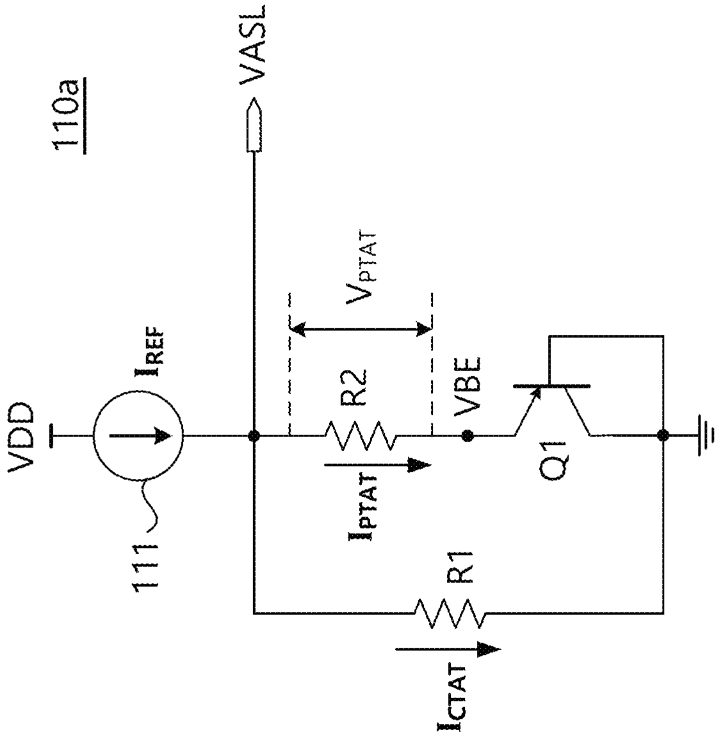
FIG. 2 is a circuit diagram showing an example of the switch control voltage generator of FIG. 1.

FIG. 2 is a circuit diagram showing the switch control voltage generator of FIG. 1 according to some example embodiments. Referring to FIG. 2, the switch control voltage generator 110*a* according to some example embodiments includes a current source 111, a bipolar junction transistor Q1, and a first resistor R1 and a second resistor R2. The switch control voltage generator 110*a* may generate the adaptive switch level voltage VASL using the base-emitter voltage VBE of the bipolar junction transistor Q1.

The first current $I_{CTAT}$ is supplied to the first resistor R1 and the second current $I_{PTAT}$ is supplied to the second resistor R2 and the diode-connected bipolar junction transistor Q1 by the power supply voltage VDD and the current source 111. The current source 111 may maintain a constant level of the reference current $I_{REF}$ even when the temperature changes. For example, the current source 111 may be a circuit that mirrors the current using a bandgap reference voltage VBGR generated by the bandgap reference generator 150 (see FIG. 1).

The reference current $I_{REF}$ supplied by the current source 111 is branched into two current paths. That is, the reference current $I_{REF}$ is branched into the first current $I_{CTAT}$ through a first path including the first resistor R1. Also, the reference current $I_{REF}$ is branched into the second current $I_{PTAT}$ through a second path including the second resistor R1 and the bipolar junction transistor Q1.

As current is supplied, a base-emitter voltage VBE is formed in the diode-connected bipolar junction transistor Q1. The base-emitter voltage VBE of the bipolar junction transistor Q1 typically exhibits a Complementary To Absolute Temperature CTAT characteristic that decreases as the temperature increases. The adaptive switch level voltage VASL, which is dominated by the influence of the base-emitter voltage VBE, also has a characteristic of decreasing with an increase in temperature.

As the adaptive switch level voltage VASL decreases as the temperature increases, the first current $I_{CTAT}$ flowing through the first resistor R1 also decreases as the temperature increases. On the other hand, the second current $I_{PTAT}$ flowing through the second resistor R2 has a magnitude obtained by subtracting the first current $I_{CTAT}$ from the reference current $I_{REF}$. Accordingly, the second current $I_{PTAT}$ flowing through the second resistor R2 will have a proportional to absolute temperature PTAT characteristic that increases as the temperature increases. Also, the voltage $V_{PTAT}$ formed on the second resistor R2 by the second current $I_{PTAT}$ will have a temperature proportional PTAT characteristic.

The adaptive switch level voltage VASL corresponds to the sum of the base-emitter voltage VBE and the temperature proportional voltage $V_{PTAT}$ formed at the second resistor R2. Since the base-emitter voltage VBE basically exhibits the temperature complementary CTAT characteristic, the adaptive switch level voltage VASL exhibits the temperature complementary characteristic by the temperature proportional voltage $V_{PTAT}$. However, by adding the temperature proportional characteristic by the temperature proportional voltage $V_{PTAT}$ formed in the second resistor R2 to the temperature complementary characteristic of the base-emitter voltage VBE, the adaptive switch level voltage VASL appears in the form of an increased slope greater than the base-emitter voltage VBE. The adaptive switch level voltage VASL may be generated at a level lower than withstand voltages of switch transistors used for chopping or trimming. That is, the adaptive switch level voltage VASL is close to the base-emitter voltage VBE at a low temperature, but may be generated as a temperature complementary CTAT voltage that is higher than the base-emitter voltage VBE by a certain level at a high temperature. The relationship between the adaptive switch level voltage VASL and the base-emitter voltage VBE will be described in more detail through drawings to be described later.

The PNP-type bipolar junction transistor Q1 has been described as an example embodiment for explaining the advantages of the inventive concepts. However, the inventive concepts are not limited to the disclosure herein and various modifications are possible. That is, the bipolar junction transistor Q1 of the inventive concepts has been described as an example as PNP type commonly used in a CMOS semiconductor process, but it will be well understood that it may be an NPN type bipolar junction transistor.

The switch control voltage generator 110*a* according to some example embodiments of the inventive concepts described above may generate the adaptive switch level voltage VASL having a slope with respect to temperature greater than that of the base-emitter voltage VBE. This function can be implemented through the current source 111, which generates a reference current $I_{REF}$ of a constant size despite changes in temperature, and current distribution using the first resistor R1 and the second resistor R2.

Figure 3A:
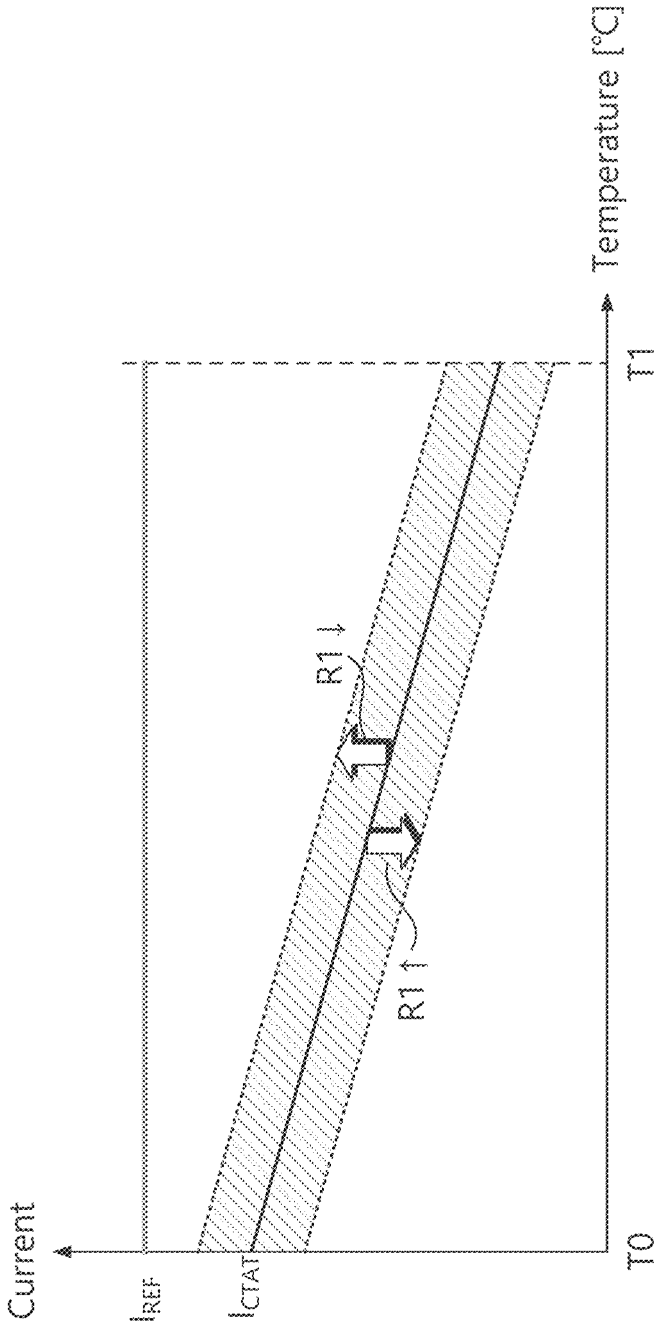
FIGS. 3A, 3B, 3C and 3D are graphs showing temperature characteristics of the control voltage generator of FIG. 2.
Figure 3B:
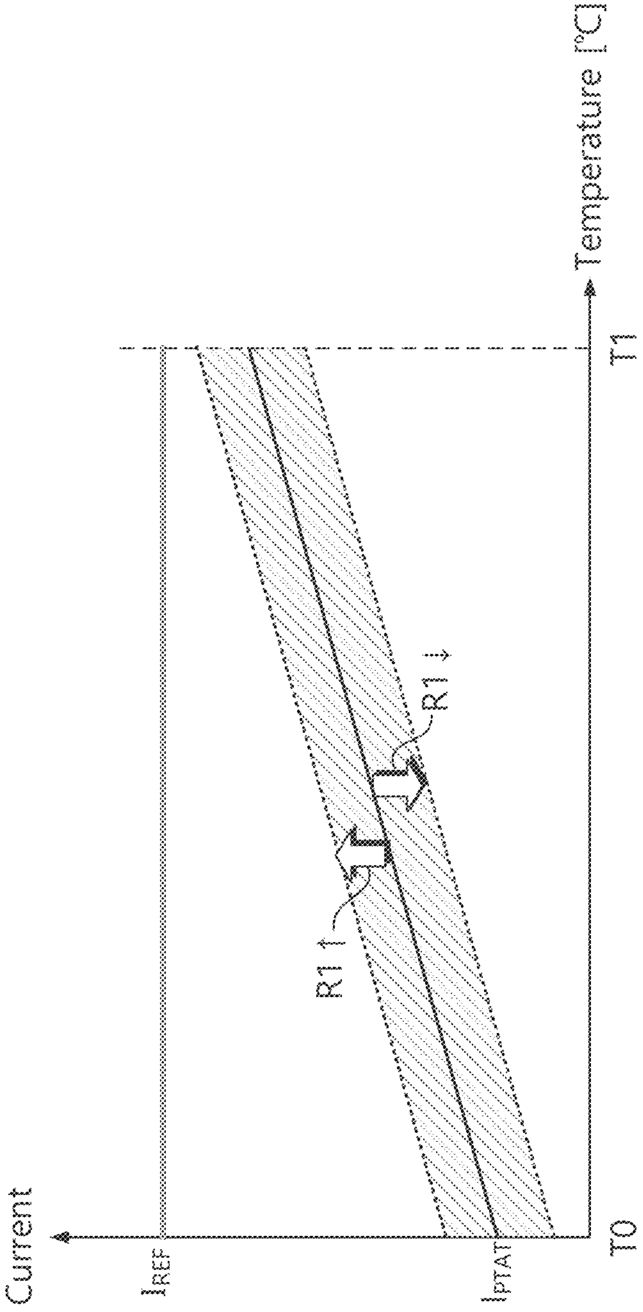
Figure 3C:
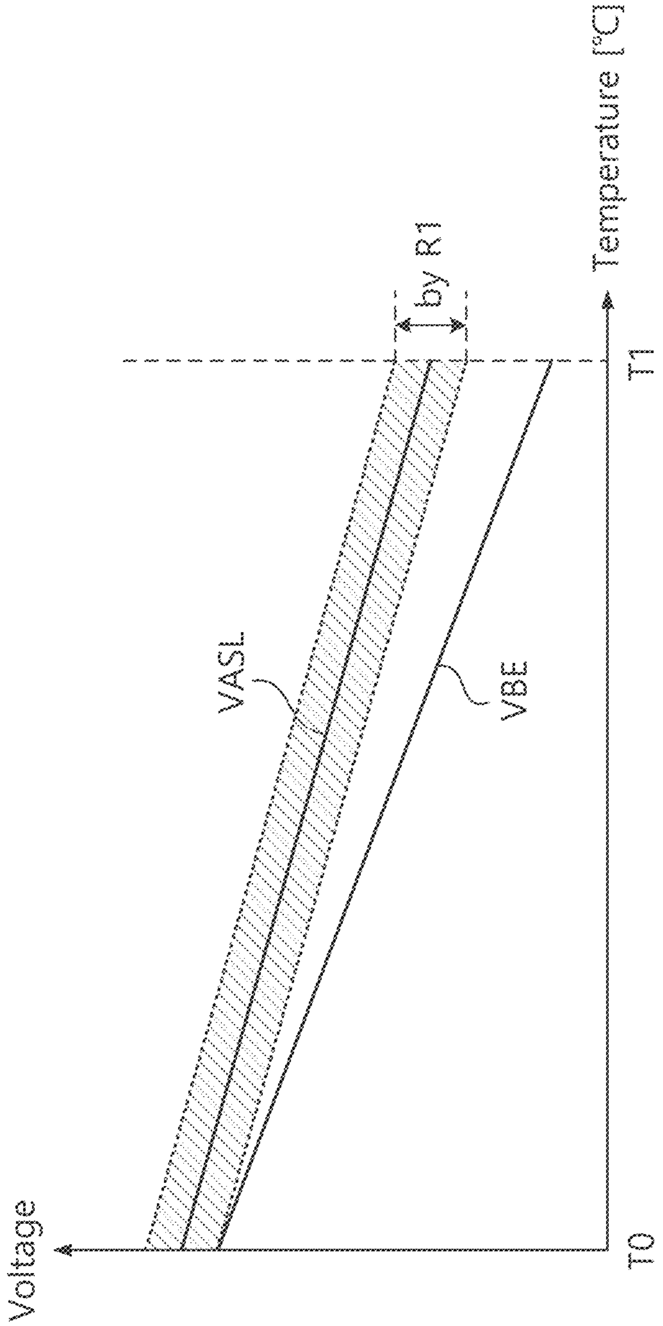
Figure 3D:
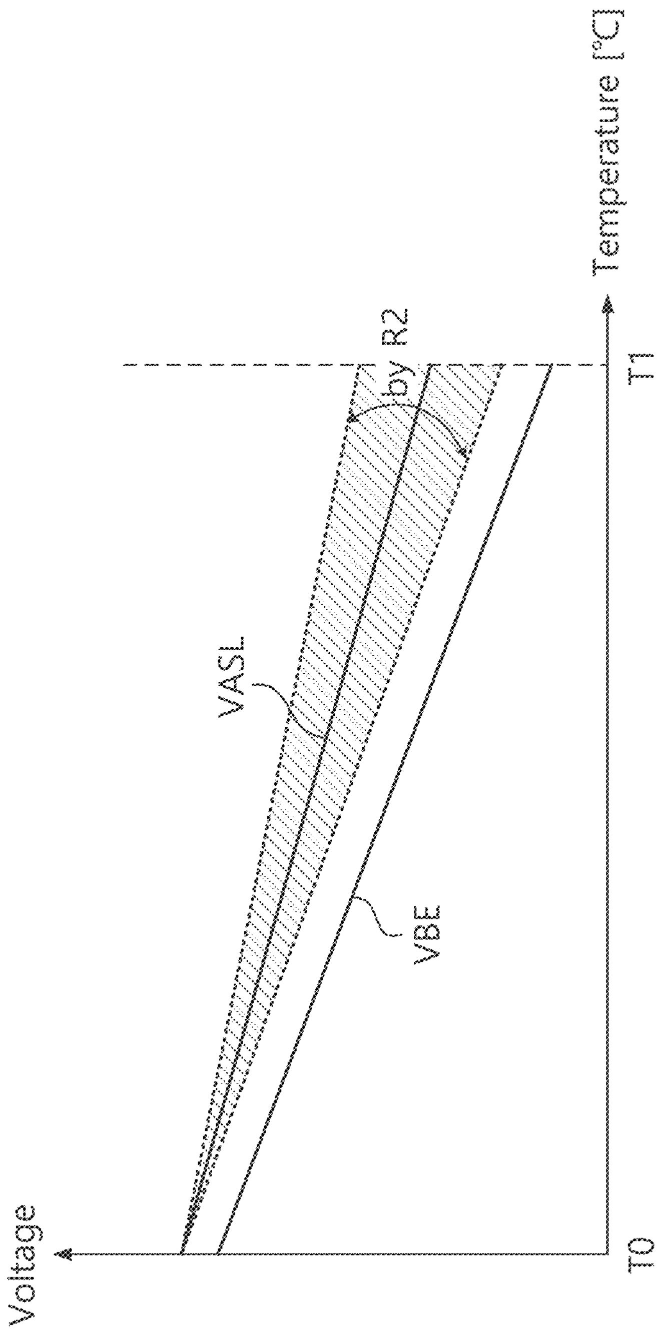

FIGS. 3A, 3B, 3C, and 3D are graphs showing temperature characteristics of the switch control voltage generator of FIG. 2. FIG. 3A shows a change in the first current $I_{CTAT}$ according to the size adjustment of the first resistor R1. FIG. 3B shows a change in the second current $I_{PTAT}$ according to the size adjustment (e.g., resistance adjustment) of the first resistor R1. FIG. 3C shows a change in the adaptive switch level voltage VASL according to the size adjustment of the first resistor R1. Also, FIG. 3D shows a change in the slope of the adaptive switch level voltage VASL according to the size adjustment of the second resistor R2.

Referring to FIG. 3A, a change in the first current $I_{CTAT}$ according to the magnitude (e.g., resistance) of the first resistor R1 in the switch control voltage generator 110*a* is shown. The reference current $I_{REF}$, which maintains a constant level with respect to temperature change, is distributed to current paths formed by the first resistor R1 and the second resistor R2. The adaptive switch level voltage VASL based on the base-emitter voltage VBE of the bipolar junction transistor Q1 basically has a temperature compensation CTAT characteristic. Accordingly, an adaptive switch level voltage VASL having a temperature compensation CTAT characteristic is formed at both ends of the first resistor R1. The magnitude of the first current $I_{CTAT}$ flowing through the first resistor R1 may be controlled by adjusting the magnitude of the first resistor R1. If the magnitude of the first resistor R1 is increased, the slope of the first current $I_{CTAT}$ is constant, but the magnitude decreases over the entire temperature range. On the other hand, if the magnitude of the first resistor R1 is decreased, the magnitude of the first current $I_{CTAT}$ will exhibit a characteristic of increasing in magnitude although the slope is constant in the entire temperature range. The characteristic of increasing or decreasing the absolute magnitude of the first current $I_{CTAT}$ in the entire temperature range is defined as an expression of increasing or decreasing an offset. As a result, it can be seen that the slope of the first current $I_{CTAT}$ with respect to temperature is constant through the adjustment of the size of the first resistor R1, but the offset can be adjusted.

Referring to FIG. 3B, a change in temperature of the second current $I_{PTAT}$ according to the magnitude (e.g., resistance) of the first resistor R1 of the switch control voltage generator 110*a* is shown. The reference current $I_{REF}$ having no level change with respect to temperature change is distributed as the first current $I_{CTAT}$ to the first resistor R1 and as the second current $I_{PTAT}$ to the second resistor R2. Accordingly, the second current $I_{PTAT}$ is obtained by subtracting the first current $I_{CTAT}$ from the reference current $I_{REF}$. This means that the size of the second current $I_{PTAT}$ can also be controlled by adjusting the size (e.g., adjusting the resistance) of the first resistor R1. If the magnitude of the first resistor R1 is increased, the magnitude of the first current $I_{CTAT}$ decreases, and as a result, the magnitude of the second current $I_{PTAT}$ increases. On the other hand, when the magnitude of the first resistor R1 is decreased, the magnitude of the first current $I_{CTAT}$ increases, so the magnitude of the second current $I_{PTAT}$ decreases. According to this mechanism, the second current $I_{PTAT}$ can increase or decrease with the same slope in the entire temperature range according to the adjustment of the first resistor R1. That is, the offset of the second current $I_{PTAT}$ can be adjusted in the entire temperature range according to the adjustment of the first resistor R1.

Referring to FIG. 3C, the change of the adaptive switch level voltage VASL according to the magnitude (e.g., resistance) of the first resistor R1 in the switch control voltage generator 110*a* is shown. The adaptive switch level voltage VASL is also a voltage formed across the first resistor R1. Accordingly, the adaptive switch level voltage VASL appears as the same voltage as the first current $I_{CTAT}$ flowing through the first resistor R1. As a result, the adaptive switch level voltage VASL may appear in a form similar to the first current $I_{CTAT}$ shown in FIG. 3A. For example, when the magnitude of the first resistor R1 is increased, the magnitude of the first current $I_{CTAT}$ is decreased. As a result, according to the size (e.g., resistance) of the first resistor R1, the adaptive switch level voltage VASL shows a characteristic in which only the size decreases in the entire temperature range without changing the slope. On the other hand, when the first resistance R1 is decreased, the level of the adaptive switch level voltage VASL increases in the entire temperature range without a change in slope according to the increase in the first current $I_{CTAT}$.

However, the adaptive switch level voltage VASL must be equal to or higher than the base-emitter voltage VBE at the low temperature TO. The adaptive switch level voltage VASL of the switch transistor of the chopping circuit 154 must be higher than the base-emitter voltage VBE of the bipolar junction transistor (Q2, see FIG. 4 described below) of the bandgap reference generator 150. This is because turn-off failure of the switch transistor of the chopping circuit 154 can be limited and/or prevented. At high temperature T1, the adaptive switch level voltage VASL must have sufficient margin over the base-emitter voltage VBE of the bipolar junction transistor (Q2, see FIG. 4 described below) of the bandgap reference generator 150. This is to block leakage current that may occur in switch transistors of the trimming circuit 152. As a result, it can be seen that the difference between the adaptive switch level voltage VASL and the base-emitter voltage VBE can be adjusted by adjusting the size of the first resistor R1.

FIG. 3D shows a change in the adaptive switch level voltage VASL according to the magnitude (e.g., resistance) of the second resistor R2 in the switch control voltage generator 110*a*. The adaptive switch level voltage VASL may be regarded as the sum of the voltage drop level at the second resistor R2 and the base-emitter voltage VBE. Therefore, when the voltage drop component by the second resistor R2 is increased in the adaptive switch level voltage VASL, the voltage proportional characteristic of the adaptive switch level voltage VASL is increased. That is, if the size (e.g., resistance) of the second resistor R2 is increased, the slope of the adaptive switch level voltage VASL with respect to temperature may be increased. On the other hand, when the voltage drop component by the second resistor R2 is reduced in the adaptive switch level voltage VASL, the voltage proportional characteristic of the adaptive switch level voltage VASL is reduced. That is, if the size of the second resistor R2 is reduced, the slope of the adaptive switch level voltage VASL with respect to temperature will be decreased.

The characteristic change of the adaptive switch level voltage VASL according to the adjustment of the first resistor R1 or the second resistor R2 in the switch control voltage generator 110*a* has been briefly described. In the switch control voltage generator 110*a* of the inventive concepts, the slope of the adaptive switch level voltage VASL with respect to temperature or the relative magnitude with respect to the base-emitter voltage VBE can be freely adjusted through selection of the first resistor R1 and the second resistor R2.

Figure 4:
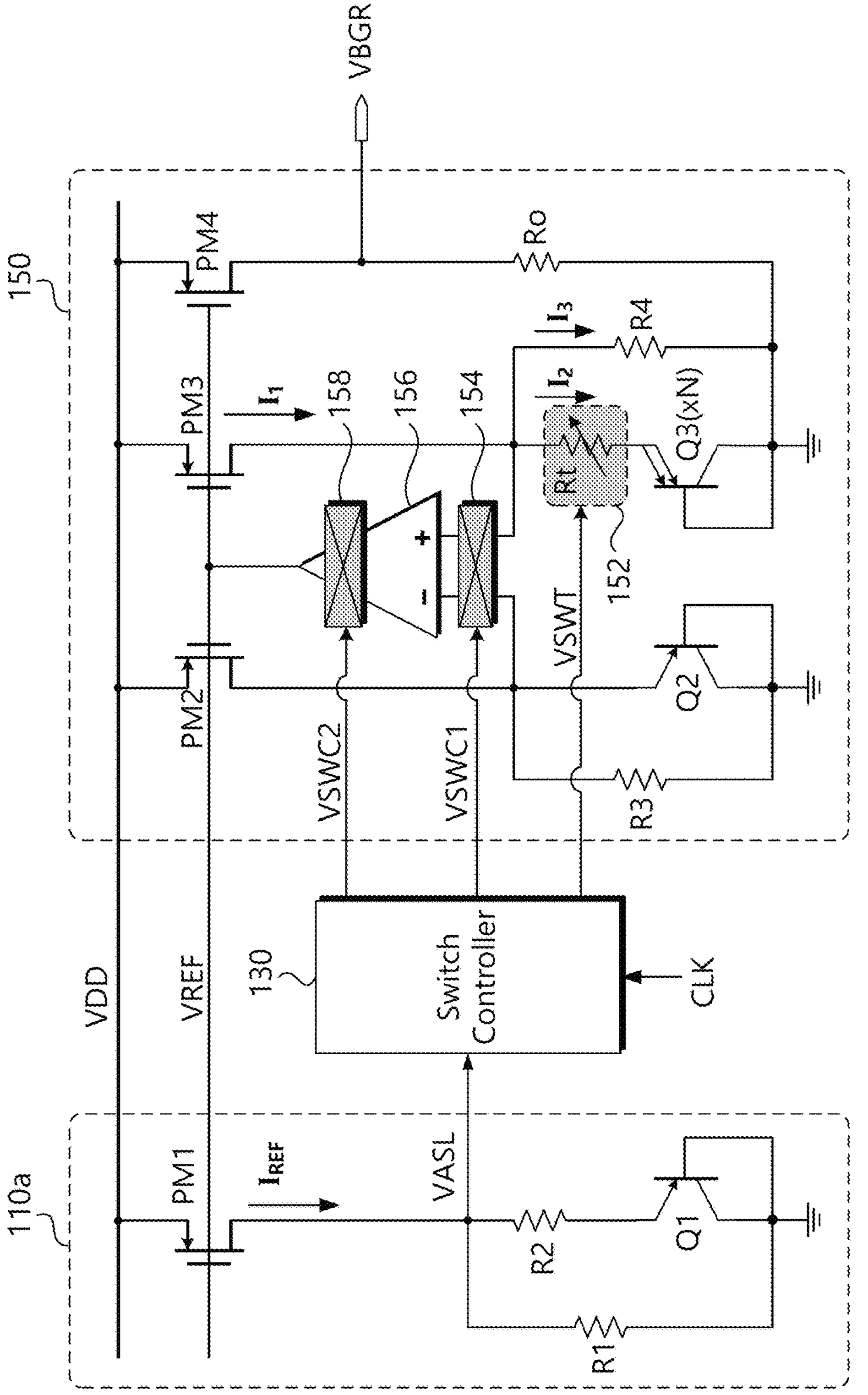
FIG. 4 is a circuit diagram showing a bandgap reference generator using a switch control voltage generator according to some example embodiments of the inventive concepts.

FIG. 4 is a circuit diagram showing a bandgap reference generator using a switch control voltage generator according to some example embodiments of the inventive concepts. Referring to FIG. 4, the bandgap reference generator 150 performs chopping or trimming using the adaptive switch level voltage VASL generated from the switch control voltage generator 110*a*. Switch control signals VSWT, VSWC1, and VSWC2 for chopping or trimming are generated by the switch controller 130.

The switch control voltage generator 110*a* includes a PMOS transistor PM1, a bipolar junction transistor Q1, and a first resistor R1 and a second resistor R2. The switch control voltage generator 110*a* may generate the adaptive switch level voltage VASL using the base-emitter voltage VBE of the bipolar junction transistor Q1. The PMOS transistor PM1 connected to the source of the power supply voltage VDD performs the function of the current source 111 of FIG. 2. That is, the reference voltage VREF output from the amplifier 156 is provided to the gate of the PMOS transistor PM1. The reference voltage VREF is one of the output voltages of the bandgap reference generator 150 and maintains a constant level even when the temperature changes. Therefore, the PMOS transistor PM1 can transfer the reference current $I_{REF}$, which is not affected by temperature change, to the first resistor R1 and the second resistor R2 by current mirroring. According to the supply of the reference current $I_{REF}$, which is not affected by temperature change, the first current $I_{CTAT}$ is supplied to the first resistor R1, and the second resistor R2 and the diode-connected bipolar junction transistor Q1 are supplied with the second current $I_{PTAT}$. As a result, the switch control voltage generator 110*a* may generate the adaptive switch level voltage VASL that is lower than the withstand voltage of the switch transistor (e.g., 9.5V) and has a slope with respect to temperature greater than the base-emitter voltage VBE.

The switch controller 130 generates switch control signals VSWT, VSWC1 and VSWC2 using the clock signal CLK and the adaptive switch level voltage VASL. The switch control signals VSWT, VSWC1, and VSWC2 are switching signals for controlling the trimming circuit 152 or the chopping circuits 154 and 158 of the bandgap reference generator 150. Trimming circuit 152 or chopping circuits 154 and 158 may include digitally driven low voltage transistors. The switch controller 130 may control the resistance of the trimming circuit 152 of the bipolar junction transistor Q3 using the switch control signal VSWT. The size of the emitter current of the bipolar junction transistor Q3 may be controlled by controlling the resistance of the trimming circuit 152.

The switch controller 130 may control the chopping circuits 154 and 158 for removing the offset between the differential signals of the amplifier 156 using the switch control signals VSWC1 and VSWC2. Levels of the switch control signals VSWT, VSWC1, and VSWC2 are generated based on the adaptive switch level voltage VASL. Accordingly, problems such as leakage current or turn-off failure that may occur depending on the temperature of the low-voltage transistors included in the trimming circuit 152 or the chopping circuits 154 and 158 can be limited or prevented.

The bandgap reference generator 150 generates a bandgap reference voltage VBGR maintaining a constant voltage level even when the temperature changes. The bandgap reference generator 150 includes bipolar junction transistors Q2 and Q3, a trimming circuit 152, chopping circuits 154 and 158, an amplifier 156, PMOS transistors PM2, PM3, and PM4, and resistors R3, R4, and Ro.

The basic operation of the bandgap reference generator 150 is based on the temperature compensation CTAT characteristics provided by using the base-emitter voltage VBE of the bipolar junction transistor Q3. That is, the bandgap reference generator 150 may generate a bandgap reference voltage VBGR having a low temperature dependence by using a temperature compensation CTAT characteristic of the base-emitter voltage VBE. For example, the current $I_1$ flowing through the PMOS transistor PM3 constituting the current mirror can be expressed as the sum of the emitter current $I_2$ of the bipolar junction transistor Q3 and the current $I_3$ flowing through the resistor R4. Also, since a current in which the current $I_1$ is mirrored also flows through the output resistance Ro, the bandgap reference voltage VBGR can be expressed by Equation 1 below.

$$VBGR = Ro \times I_1 = Ro \times (I_2 + I_3) = Ro \times \left( \frac{Vt \times \ln(N)}{Rt} + \frac{VBE}{R4} \right) \quad \text{[Equation 1]}$$

'Vt' represents a thermal voltage that increases in proportion to temperature, 'N' represents the number of parallel connections of bipolar junction transistor Q3, and 'VBE' represents the base-emitter voltage of bipolar junction transistor Q3. Therefore, it can be seen that the temperature dependence of the bandgap reference voltage VBGR can be controlled by adjusting the trim resistance Rt of the trimming circuit 152. As a result, it can be seen that the bandgap reference voltage VBGR can be maintained at a constant level regardless of temperature change through the setting of the trim resistor Rt of the trimming circuit 152.

To this end, the trimming circuit 152 provides a function of a variable resistor for adjusting the resistance value of the trim resistor Rt by trimming a plurality of series-connected resistors using a plurality of low voltage switches. The trimming circuit 152 receives the switch control signal VSWT generated based on the adaptive switch level voltage VASL. The level of the switch control signal VSWT may be provided in a form in which the slope with respect to temperature is increased greater than that of the base-emitter voltage VBE. For example, the switches of the trimming circuit 152 may be digital low voltage transistors having a withstand voltage of 0.95V. In some cases, at low temperatures, the gate voltage of the low-voltage transistor is lower than the base-emitter voltage VBE and may not be completely turned off. However, as shown in FIG. 3D, the adaptive switch level voltage VASL of the inventive concepts is generated higher than the base-emitter voltage VBE even at a low temperature (T0, for example, −55° C.). The switch control signal VSWT generated using the adaptive switch level voltage VASL can also maintain a higher value than the base-emitter voltage VBE even at a low temperature. Even at a high temperature, the switch control signal VSWT is higher than the base-emitter voltage VBE, so that leakage current of the low-voltage switches turned off for trimming can be effectively blocked.

Chopping circuits 154 and 158 switch at a specific frequency to effectively remove the offset that exists between the differential signals of amplifier 156. For example, the positive input terminal (+) and the negative input terminal (−) of the amplifier 156 are virtual ground terminals to be maintained at the same voltage by the bipolar junction transistors Q2 and Q3. The offset, which is the voltage difference between the positive input terminal (+) and the negative input terminal (−), provides an offset to the output voltage of the amplifier 156, thereby degrading the accuracy of the bandgap reference voltage VBGR. Accordingly, chopping circuits 154 and 158 use an alternating switch to remove this offset. The low-voltage transistors used in the chopping circuits 154 and 158 may be, for example, digital low-voltage transistors having withstand voltage or a breakdown voltage of 0.95V. If the gate voltage of the low-voltage transistor is lower than the base-emitter voltage VBE at low temperature, a turn-off failure may occur in which the transistor is not completely turned off. Alternatively, the chopping effect may be reduced due to leakage current even at high temperatures. However, as shown in FIG. 3D, the adaptive switch level voltage VASL of the present inventive concepts is provided higher than the base-emitter voltage VBE even at a low temperature (T0, for example, −55° C.). The switch control signals VSWC1 and VSWC2 generated from the adaptive switch level voltage VASL may also maintain a higher value than the base-emitter voltage VBE even at a low temperature. Even at a high temperature, the switch control signals VSWC1 and VSWC2 are higher than the base-emitter voltage VBE, so that leakage current of the low-voltage switches turned off for chopping can be effectively blocked.

Here, the PNP-type bipolar junction transistors Q1, Q2, and Q3 have been described with respect to some example embodiments of the inventive concepts. However, the inventive concepts are not limited to the disclosure herein and various modifications are possible. For example, the bipolar junction transistors Q1, Q2, and Q3 of the inventive concepts have been described as PNP-type generally used in a CMOS semiconductor process, but it will be well understood that in some other example embodiments they may be NPN-type bipolar junction transistors.

The structure of the bandgap reference generator 150 performing chopping and trimming using the adaptive switch level voltage VASL according to some example embodiments of the inventive concepts has been briefly described. The trimming circuit 152, and the chopping circuits 154 and 158, including low-voltage transistors use the adaptive switch level voltage VASL having a higher level than the base-emitter voltage VBE and having a slope with respect to temperature greater than that of the base-emitter voltage VBE. Therefore, reliability of the trimming and chopping operations of the bandgap reference generator 150 can be secured.

Figure 5A:
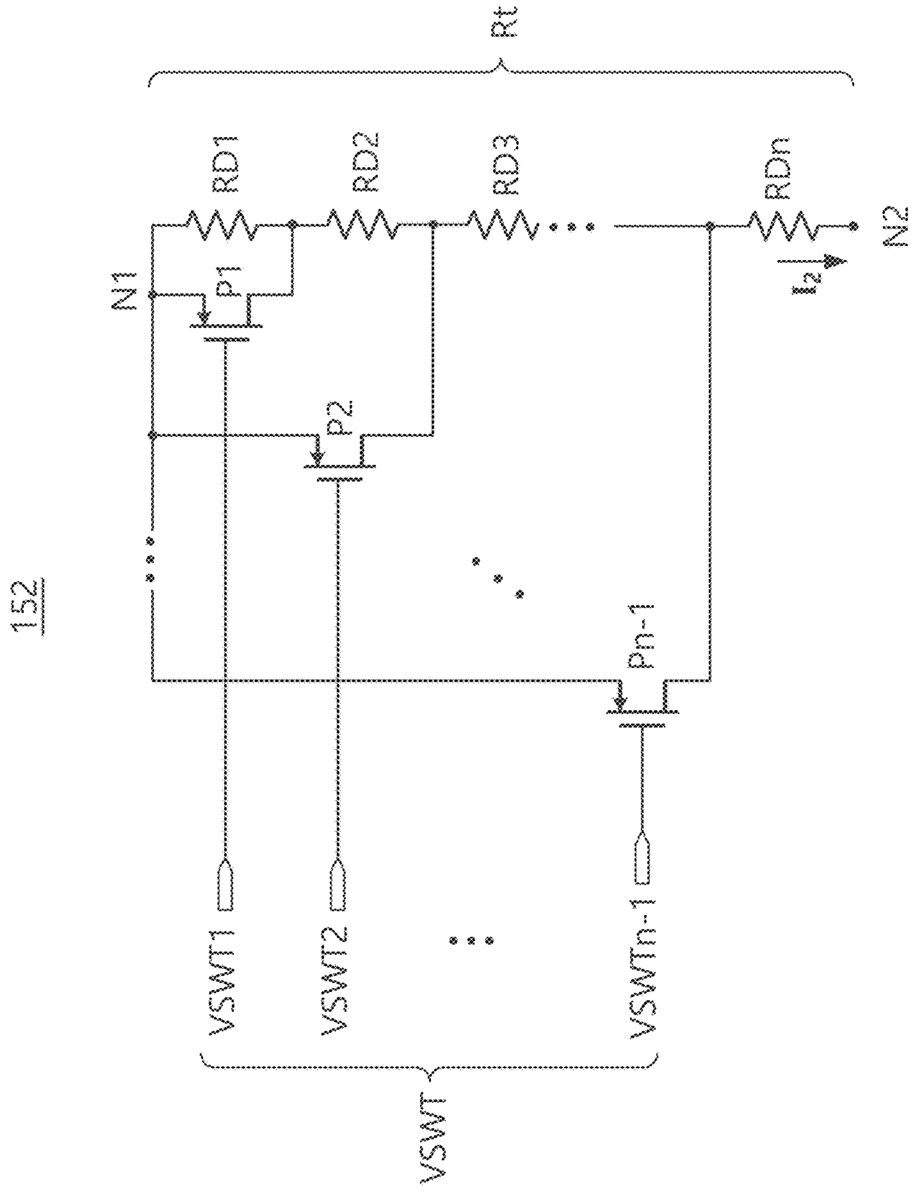
FIG. 5A and FIG. 5B are circuit diagrams showing the trimming circuit and the chopping circuit of FIG. 4, respectively, according to some example embodiments.
Figure 5B:
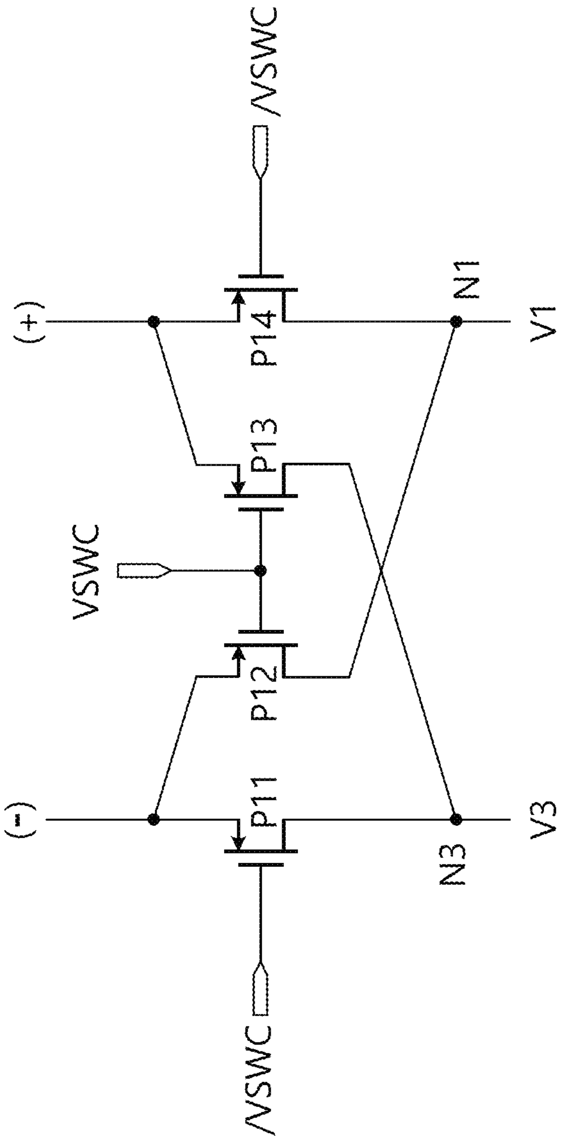

FIG. 5A and FIG. 5B are circuit diagrams according to some example embodiments showing the trimming circuit and the chopping circuit of FIG. 4, respectively. Referring to FIG. 5A, the trimming circuit 152 is connected between a first node N1 connected to the positive input terminal (+) of the amplifier 156 and a second node N2 connected to the bipolar junction transistor Q3. The size of the emitter current $I_2$ of the bipolar junction transistor Q3 may be controlled by the trim resistor Rt set by the trimming circuit 152.

The trimming circuit 152 includes a plurality of series resistors RD1 to RDn and switches P1 to Pn−1 that bypass the first node N1 and each series resistor RD1 to RDn. Each of the switches P1 to Pn−1 may be formed of a low voltage transistor having a withstand voltage of 0.95V, for example. If all of the switch control signals VSWT1 to VSWTn−1 are at a high level, all switches P1 to Pn−1 are turned off and the trim resistor Rt is the sum of the series resistors RD1 to RDn. On the other hand, when only the switch control signals VSWT1 and VSWT2 are provided at low levels and the remaining switch control signals VSWT3 to VSWTn−1 are provided at high levels for example, the switches P1 and P2 are turned on, and the switches P3 to Pn−1 will be turned off. Then, the trim resistor Rt is set to a size obtained by subtracting the two resistors RD1 and RD2 from the sum of the series resistors RD1 to RDn.

The switches P1 to Pn−1 of the trimming circuit 152 may be low voltage transistors used in digital circuits and having a withstand voltage of about 0.95V. The switches P1 to Pn−1 may be controlled using the switch control signals VSWT1 to VSWTn generated using the adaptive switch level voltage VASL. Accordingly, gate voltages of the turned-off switches P1 to Pn−1 may be provided higher than the base-emitter voltage VBE even at a high temperature, thereby blocking leakage current.

The switches P1 to Pn−1 are illustrated as PMOS-type transistors, but the inventive concepts are not limited thereto. It will be well understood that in some other example embodiments the switches P1 to Pn−1 may be implemented with NMOS-type transistors.

Referring to FIG. 5B, the chopping circuit 154 is configured using a plurality of switches P11 to P14. The switches P11 to P14 may be, for example, low voltage transistors having a withstand voltage of 0.95V used in digital circuits. The chopping circuit 154 repeatedly crosses and transfers the input differential voltages V1 and V3 to both input terminals (+, −) of the amplifier 156 using the switches P11 to P14. The switches P12 and P13 are switched by the switch control signal VSWC (e.g., VSWC1), and the switches P11 and P14 are switched by the inverted switch control signal/VSWC. Then, an offset of the differential voltages V1 and V3 transmitted from the nodes N1 and N3 respectively corresponding to the virtual ground terminal may be removed.

The switch control signals VSWC and/VSCW are generated using the adaptive switch level voltage VASL. Accordingly, gate voltages of the turned-off switches P11 to P14 may be provided higher than the base-emitter voltage VBE at both low and high temperatures, thereby effectively blocking leakage current. The switches P11 to P14 are illustrated as PMOS-type transistors, but the inventive concepts are not limited thereto. It will be well understood that in some other example embodiments the switches P11 to P14 may be implemented with NMOS-type transistors.

Figure 6:
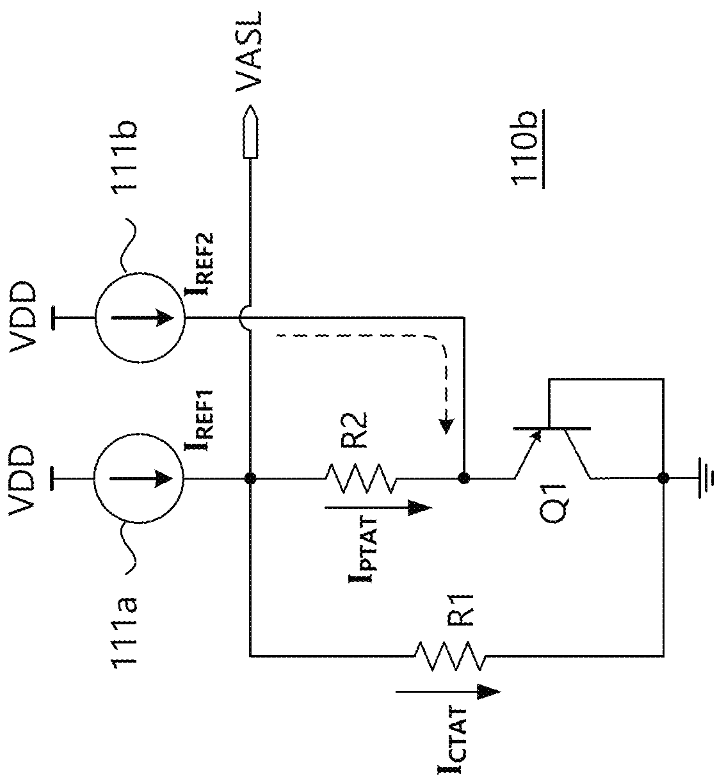
FIG. 6 is a circuit diagram showing the switch control voltage generator of FIG. 1 according to some example embodiments of the inventive concepts.

FIG. 6 is a circuit diagram showing the switch control voltage generator of FIG. 1 according to some other example embodiments of the inventive concepts. Referring to FIG. 6, the switch control voltage generator **110*b* includes a first current source 111*a*, a second current source 111*b*, a bipolar junction transistor Q1, and a first resistor R1 and a second resistor R2. The switch control voltage generator 110*b* may stably generate the adaptive switch level voltage VASL using the base-emitter voltage VBE of the bipolar junction transistor Q1. The switch control voltage generator 110*b* may ensure operation reliability of the bipolar junction transistor Q1 by using the second current source 111*b***.

The first current source **111*a*, which provides a constant level of the first reference current $I_{REF1}$ even when the temperature changes, supplies the first current $I_{CTAT}$ to the first resistor R1. Also, the first current source 111*a* may supply the second current $I_{PTAT}$ to the second resistor R2 and the diode-connected bipolar junction transistor Q1. The first current source 111*a* may maintain the level of the first reference current $I_{REF1}$ with respect to temperature change. For example, the first current source 111*a* may be a circuit that mirrors current using a bandgap reference voltage generated by a bandgap reference generator 150 (see FIG. 1**).

When the first reference current $I_{REF1}$ is supplied by the first current source **111*a*, the base-emitter voltage VBE is formed in the diode-connected bipolar junction transistor Q1. The base-emitter voltage VBE of the bipolar junction transistor Q1 exhibits the temperature compensation CTAT characteristic that decreases as the temperature increases. Also, like the base-emitter voltage VBE, the adaptive switch level voltage VASL also has a characteristic of decreasing with an increase in temperature. As the adaptive switch level voltage VASL decreases as the temperature increases, the first current $I_{CTAT}$ flowing through the first resistor R1 also decreases as the temperature increases. The second current $I_{PTAT}$ flowing through the second resistor R2** is obtained by subtracting the first current $I_{CTAT}$ from the constant first reference current $I_{REF1}$ according to the change in temperature. Accordingly, the second current $I_{PTAT}$ flowing through the second resistor R2 will have a temperature proportional characteristic that increases as the temperature increases. That is, the temperature proportional voltage $V_{PTAT}$ formed at the second resistor R2 will have a temperature proportional voltage characteristic proportional to temperature.

The adaptive switch level voltage VASL corresponds to the sum of the base-emitter voltage VBE and the temperature proportional voltage $V_{PTAT}$ formed at the second resistor R2. Since the base-emitter voltage VBE basically exhibits the temperature complementary CTAT characteristic, the switch level voltage VASL adaptive by the temperature proportional voltage $V_{PTAT}$ exhibits the temperature complementary characteristic. However, by adding the temperature proportional characteristic by the temperature proportional voltage $V_{PTAT}$ formed in the second resistor R2 to the temperature complementary characteristic of the base-emitter voltage VBE, the adaptive switch level voltage VASL appears in the form of an increased slope greater than the base-emitter voltage VBE. The adaptive switch level voltage VASL may be generated at a level lower than withstand voltages (e.g., 0.95V) of switch transistors used for chopping or trimming. That is, the adaptive switch level voltage VASL may be generated as a temperature complementary voltage that is close to the base-emitter voltage VBE at a low temperature but higher than the base-emitter voltage VBE by a certain level at a high temperature.

The first reference current $I_{REF1}$ supplied from the first current source 111*a* is branched into a first current $I_{CTAT}$ flowing toward the first resistor R1 and a second current $I_{PTAT}$ flowing toward the second resistor R2. Therefore, when the second current $I_{PTAT}$ is not sufficiently supplied due to the current distribution, the bipolar junction transistor Q1 may not be activated. In this case, the adaptive switch level voltage VASL reflects only the effect of the voltage drop of the first resistor R1 that is not related to the base-emitter voltage VBE.

Therefore, according to some example embodiments of the inventive concepts as shown in FIG. 6, the switch control voltage generator 110*b* can supply the second reference current $I_{REF2}$ directly at the emitter of the bipolar junction transistor Q1 using the second current source 111*b*. Even if the second current $I_{PTAT}$ is not sufficiently supplied for various reasons, the second current source 111*b* stably supplies the second reference current $I_{REF2}$. Thus, the cut-off state of the bipolar junction transistor Q1 can be limited and/or prevented. Accordingly, the adaptive switch level voltage VASL having a slope with respect to temperature greater than that of the base-emitter voltage VBE may be stably provided.

The size of the second reference current $I_{REF2}$ provided by the second current source 111*b* may be smaller than that of the first reference current $I_{REF1}$. For example, the magnitude of the second reference current $I_{REF2}$ may be supplied as ¼ of the magnitude of the first reference current $I_{REF1}$. The bipolar junction transistor Q1 has been described as an example of a PNP-type generally used in a CMOS semiconductor process, but it will be well understood that in other example embodiments it may be an NPN-type bipolar junction transistor.

The switch control voltage generator 110*b* according to some other example embodiments can generate the adaptive switch level voltage VASL having the increased slope with respect to temperature greater than the base-emitter voltage VBE. A second current source 111*b* may be added to stably supply the operating current of the bipolar junction transistor Q1. Therefore, according to the switch control voltage generator 110*b* according to some other example embodiments, stable operation of the bipolar junction transistor Q1 can be guaranteed.

Figure 7:
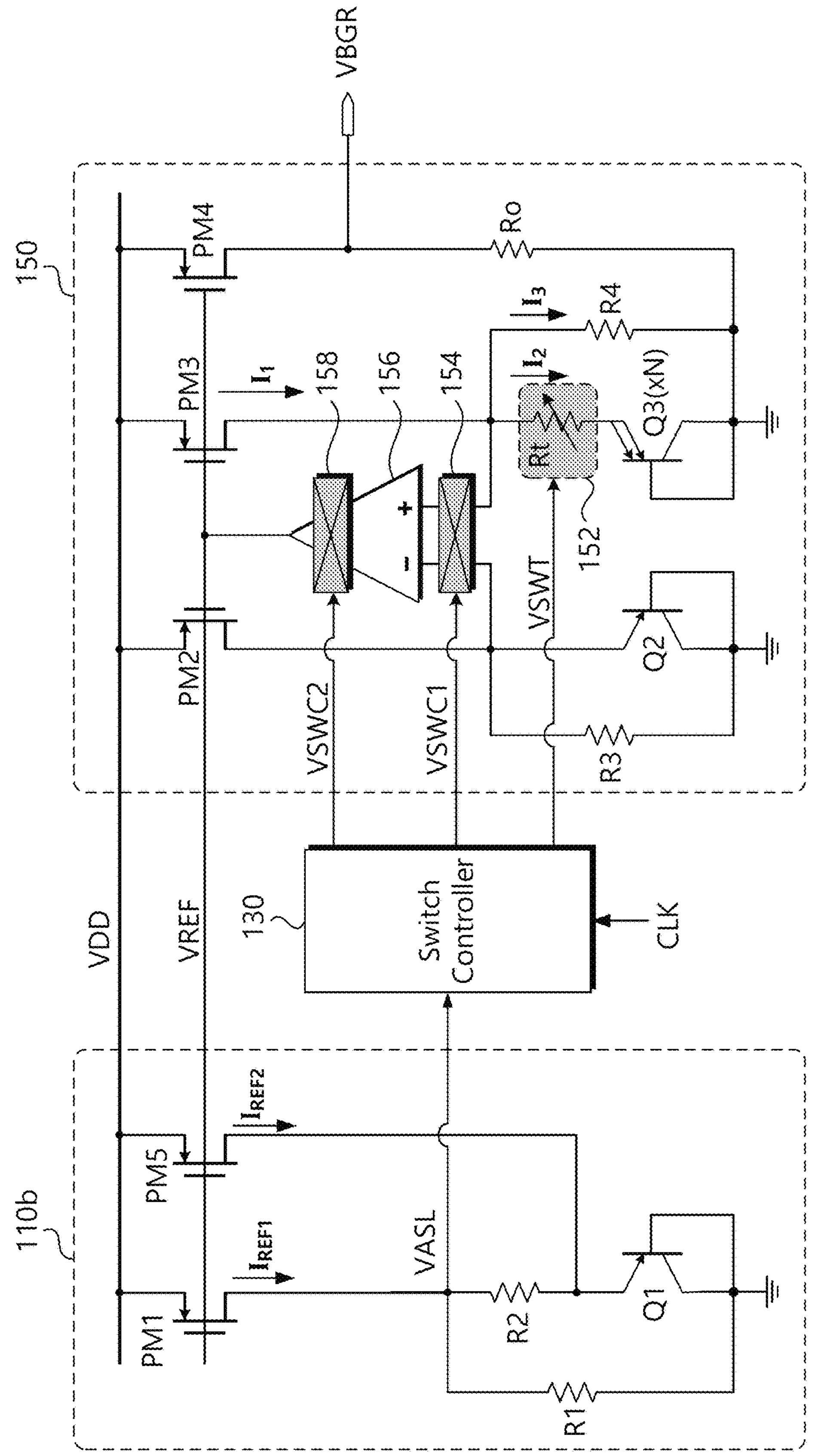
FIG. 7 is a circuit diagram showing a bandgap reference generator using the switch control voltage generator according to some example embodiments of the inventive concepts of FIG. 6.

FIG. 7 is a circuit diagram showing a bandgap reference generator of some other example embodiments using the switch control voltage generator of FIG. 6. Referring to FIG. 7, the bandgap reference generator 150 may perform chopping or trimming using the adaptive switch level voltage VASL generated from the switch control voltage generator 110*b*. The switch control signals VSWT, VSWC1, and VSWC2 for chopping or trimming are generated by the switch controller 130 based on the adaptive switch level voltage VASL.

The switch control voltage generator 110*b* includes PMOS transistors PM1 and PM5, a bipolar junction transistor Q1, and a first resistor R1 and a second resistor R2. The switch control voltage generator 110*b* generates an adaptive switch level voltage VASL using the base-emitter voltage VBE of the bipolar junction transistor Q1. The PMOS transistors PM1 and PM5 whose gates are provided with the reference voltage VREF and whose sources are connected to the power supply voltage VDD perform the functions of the current sources 111*a* and 111*b* of FIG. 6. That is, the reference voltage VREF output from the amplifier 156 is provided to the gates of the PMOS transistors PM1 and PM5. The reference voltage VREF is one of the output voltages of the bandgap reference generator 150 and is a voltage that maintains a constant level even when the temperature changes. Accordingly, the PMOS transistors PM1 and PM5 can supply reference currents $I_{REF1}$ and $I_{REF2}$ that are not affected by temperature changes by current mirroring. The first reference current $I_{REF1}$ is transferred to the first resistor R1 and the second resistor R2, and the second reference current $I_{REF2}$ is supplied as a current for activating the operation of the bipolar junction transistor Q1. In some example embodiments, the size of the PMOS transistors PM1 and PM5 may be determined according to the size ratio of the second reference current $I_{REF2}$ and the first reference current $I_{REF1}$.

According to the supply of the reference currents $I_{REF1}$ and $I_{REF2}$, which are not affected by temperature changes, the first current $I_{CTAT}$ is supplied to the first resistor R1, and the second current $I_{PTAT}$ is supplied to the second resistor R2 and the diode-connected bipolar junction transistor Q1. As a result, as described above with reference to FIG. 6, the switch control voltage generator 110*b* stabilizes the adaptive switch level voltage VASL, which is lower than the withstand voltage of the switch transistor and has a slope greater than the base-emitter voltage VBE with respect to temperature.

Switch controller 130 and bandgap reference generator 150 may be substantially the same as those of FIG. 4, and description thereof will be omitted.

A technique for stably generating an adaptive switch level voltage VASL using the switch control voltage generator 110*b* according to some other example embodiments of the inventive concepts has been described. Reliability of chopping and trimming of the bandgap reference generator 150 may be increased by using the stable level of the adaptive switch level voltage VASL generated by the switch control voltage generator 110*b*. Accordingly, the bandgap reference generator 150 of the inventive concepts can provide a high-quality bandgap reference voltage VBGR capable of compensating for temperature dependence.

Figure 8:
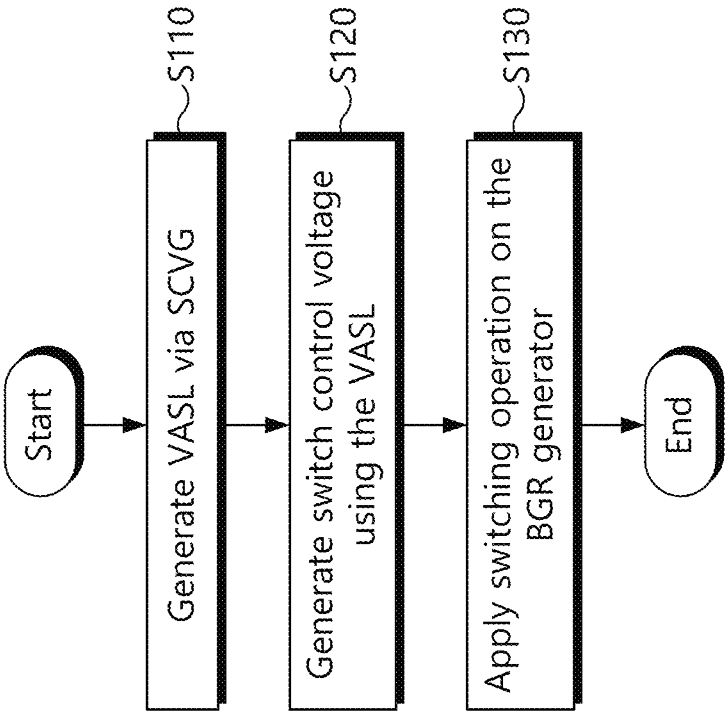
FIG. 8 is a flowchart illustrating a method of controlling low voltage switches used for trimming or chopping of a bandgap reference generator according to some example embodiments of the inventive concepts.

FIG. 8 is a flowchart illustrating a method of controlling low-voltage switches used for dynamic element matching, trimming, or chopping of a bandgap reference generator according to some example embodiments of the inventive concepts. Referring to FIG. 8, the low voltage switches can be stably controlled regardless of temperature through the adaptive switch level voltage VASL generated through the switch control voltage generator 110.

In step S110, the switch control voltage generator 110 (see FIG. 1) generates an adaptive switch level voltage VASL. The switch control voltage generator 110 may be implemented with at least one of the structures of FIG. 2 or FIG. 6. For example, the switch control voltage generator 110 includes a current source 111 (that may be for example a PMOS transistor PM1 as shown in FIG. 4) generating a reference current $I_{REF}$ maintaining a constant level with respect to temperature, a bipolar junction transistor Q1, and a first resistor R1 and a second resistor R2. The magnitude and slope of the adaptive switch level voltage VASL may be set as target values through the magnitudes of the first resistor R1 and the second resistor R2. For example, the adaptive switch level voltage VASL may be set to a relatively higher value than the base-emitter voltage VBE of the bipolar junction transistor Q1 over the entire temperature range in the manner described in FIG. 2 or FIG. 6. The adaptive switch level voltage VASL may be generated in a form in which a gradient with respect to temperature is greater than that of the base-emitter voltage VBE.

In step S120, switch control signals VSWT, VSWC1 and VSWC2 may be generated using the adaptive switch level voltage VASL provided from the switch control voltage generator 110. For example, the switch controller 130 (see FIG. 1) generates switch control signals VSWT, VSWC1 and VSWC2 corresponding to the level of the adaptive switch level voltage VASL. The switch control signals VSWC1 and VSWC2 provided to the chopping circuits 154 and 158 may be provided in the form of complementary signals switched at a specific frequency (e.g., see FIG. 5B). The switch control signal VSWT provided to the trimming circuit 152 may be generated as a set of control signals for turning on or off switches including a plurality of low voltage transistors (e.g., see FIG. 5A). The high level of these switch control signals VSWC1 and VSWC2 may be made equal to the temperature adaptive switch level voltage VASL.

In step S130, the trimming circuit 152 or the chopping circuits 154 and 158 of the bandgap reference generator 150 (see FIG. 1) and the dynamic element matching circuit (not shown) performs trimming, dynamic element matching or chopping operations in response to the switch control signals VSWT, VSWC1 and VSWC2. Trimming circuit 152 or chopping circuits 154 and 158 may include digitally driven low voltage transistors. Resistance of the trimming circuit 152 is set to control the emitter current of the bipolar junction transistor Q3 by the switch control signal VSWT. The offset of the amplifier 156 may be removed by supplying the switch control signals VSWC1 and VSWC2 to the chopping circuits 154 and 158.

Operational reliability of the low voltage transistors included in the trimming circuit 152 or the chopping circuits 154 and 158 can be increased by the switch control signals VSWT, VSWC1 and VSWC2 generated based on the adaptive switch level voltage VASL. That is, problems such as leakage current or turn-off failure of low-voltage transistors that may occur due to temperature changes can be limited or prevented by the switch control signals VSWT, VSWC1, and VSWC2.

Figure 9:
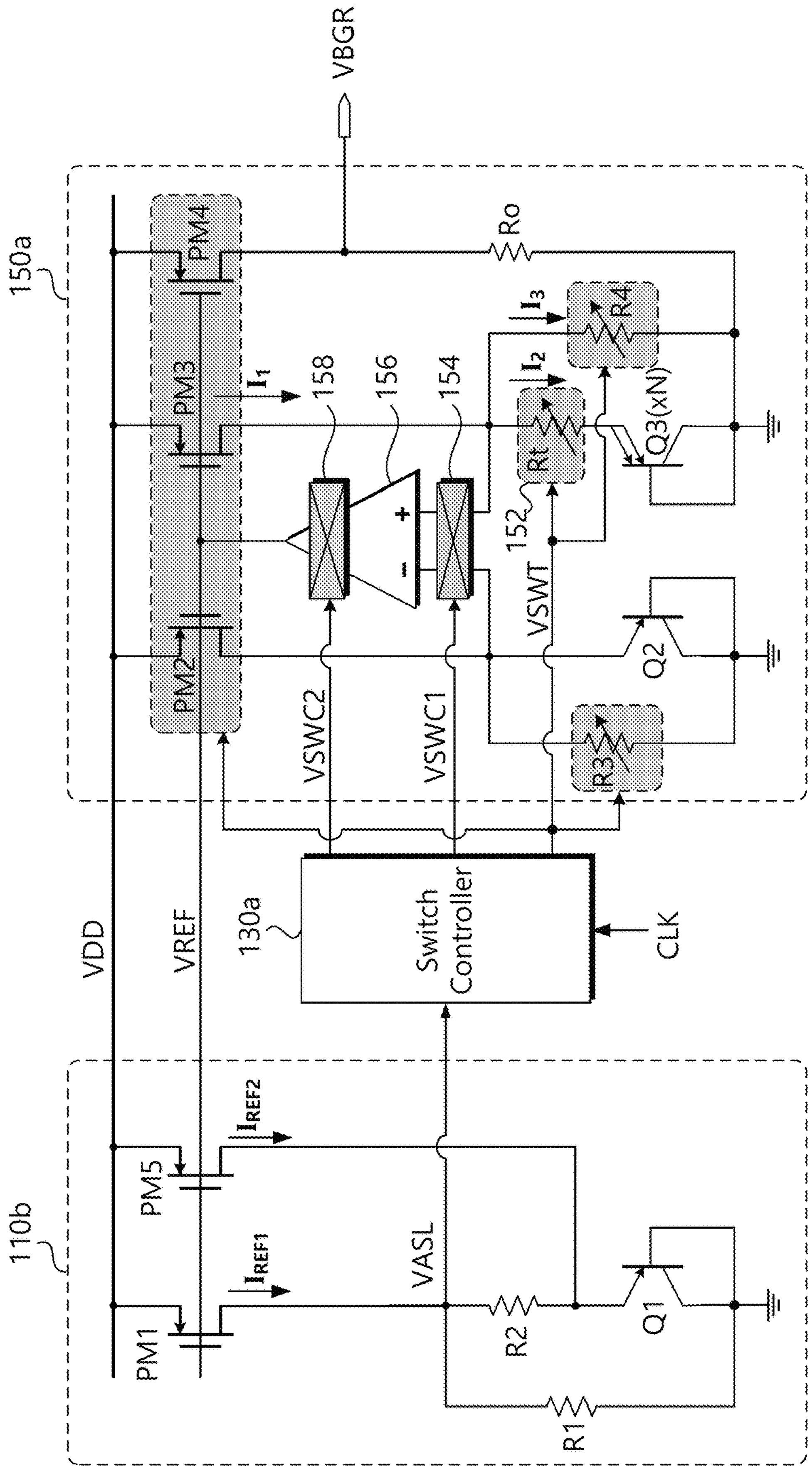
FIG. 9 is a circuit diagram showing a bandgap reference generator using a switch control voltage generator according to some example embodiments of the inventive concepts.

FIG. 9 is a circuit diagram showing a bandgap reference generator using a switch control voltage generator according to some other example embodiments of the inventive concepts. Referring to FIG. 9, the bandgap reference generator 150*a* may perform chopping or trimming of various devices using the adaptive switch level voltage VASL generated from the switch control voltage generator 110*b*. The switch control signals VSWT, VSWC1, and VSWC2 for chopping or trimming are generated by the switch controller 130 based on the adaptive switch level voltage VASL.

The switch control voltage generator 110*b* includes PMOS transistors PM1 and PM5, a bipolar junction transistor Q1, and a first resistor R1 and a second resistor R2. The switch control voltage generator 110*b* generates the adaptive switch level voltage VASL using the base-emitter voltage VBE of the bipolar junction transistor Q1. The circuit structure of FIG. 7 including two current sources is shown as an example of the switch control voltage generator 110*b*, but the inventive concepts are not limited thereto. That is, it will be appreciated that in other example embodiments the switch control voltage generator 110*b* may be replaced by the switch control voltage generator 110*a* of FIG. 4 having a single current source.

The switch controller 130*a* generates switch control signals VSWT, VSWC1, and VSWC2 using the clock signal CLK and the adaptive switch level voltage VASL. The switch control signals VSWT, VSWC1, and VSWC2 are switching signals for trimming circuit 152, the chopping circuits 154 and 158, and elements R3, R4, PM2, PM3, and PM4 connected to the bipolar junction transistors Q2 and Q3 of the bandgap reference generator 150*a*. Trimming circuit 152, chopping circuits 154 and 158, and elements R3, R4, PM2, PM3, and PM4 may include digitally driven low voltage transistors.

The switch controller 130*a* may use the switch control signal VSWT to set the trimming circuit 152 of the bipolar junction transistor Q3 and the resistance of the resistor elements R3 and R4. Also, the switch controller 130*a* may trim between the PMOS transistors PM2, PM3, and PM4 used as current sources through mirroring using the switch control signal VSWT. That is, characteristic adjustment (e.g., channel size) can be trimmed using the switch control signal VSWT in order to equally set the magnitude of the current flowing through each of the PMOS transistors PM2, PM3, and PM4. The control method of the chopping circuits 154 and 158 and the trimming circuit 152 of the switch controller 130*a* is the same as that of FIG. 7 described above. Therefore, descriptions of these will be omitted.

The bandgap reference generator 150*a* generates a bandgap reference voltage VBGR maintaining a constant voltage level even when the temperature changes. The bandgap reference generator 150*a* includes bipolar junction transistors Q2 and Q3, a trimming circuit 152, chopping circuits 154 and 158, an amplifier 156, PMOS transistors PM2, PM3, and PM4, and resistors R3, R4, and Ro. For example, in the bandgap reference generator 150*a*, various elements Rt, R3, R4, PM2, PM3, and PM4 connected to the bipolar junction transistor Q3 may be trimmed by the switch control signal VSWT. The switch control signal VSWT generated from the adaptive switch level voltage VASL can maintain a higher value than the base-emitter voltage VBE even at a low temperature. Even at a high temperature, the switch control signal VSWT is higher than the base-emitter voltage VBE, so that leakage current of the low-voltage switches turned off for trimming can be effectively blocked.

The bandgap reference generator 150*a* can effectively remove an offset between differential signals of the amplifier 156 using the chopping circuits 154 and 158. The chopping circuits 154 and 158 may be switched by switch control signals VSWC1 and VSWC2, respectively. The switch control signals VSWC1 and VSWC2 generated from the adaptive switch level voltage VASL may also maintain a higher value than the base-emitter voltage VBE even at a low temperature. Even at a high temperature, the switch control signals VSWC1 and VSWC2 are higher than the base-emitter voltage VBE, so that leakage current of the low-voltage switches turned off for chopping can be effectively blocked.

The PNP-type bipolar junction transistors Q1, Q2, and Q3 have been described as an example for explaining the advantages of the inventive concepts. However, the inventive concepts are not limited thereto. For example, the bipolar junction transistors Q1, Q2, and Q3 of the inventive concepts have been described as PNP-type generally used in a CMOS semiconductor process, but it will be well understood that in other example embodiments they may be NPN-type bipolar junction transistors.

The structure of the bandgap reference generator 150*a* performing chopping and trimming using the adaptive switch level voltage VASL according to some example embodiments of the inventive concepts has been briefly described. The chopping circuits 154 and 158 including low-voltage transistors, the trimming circuit 152, and various elements R3, R4, PM2, PM3, and PM4 may be switched using the adaptive switch level voltage VASL having a higher level than the base-emitter voltage VBE and having a slope with respect to temperature greater than that of the base-emitter voltage VBE. Therefore, according to the inventive concepts, reliability of the trimming and chopping operations of the bandgap reference generator 150*a* can be secured.

Figure 10:
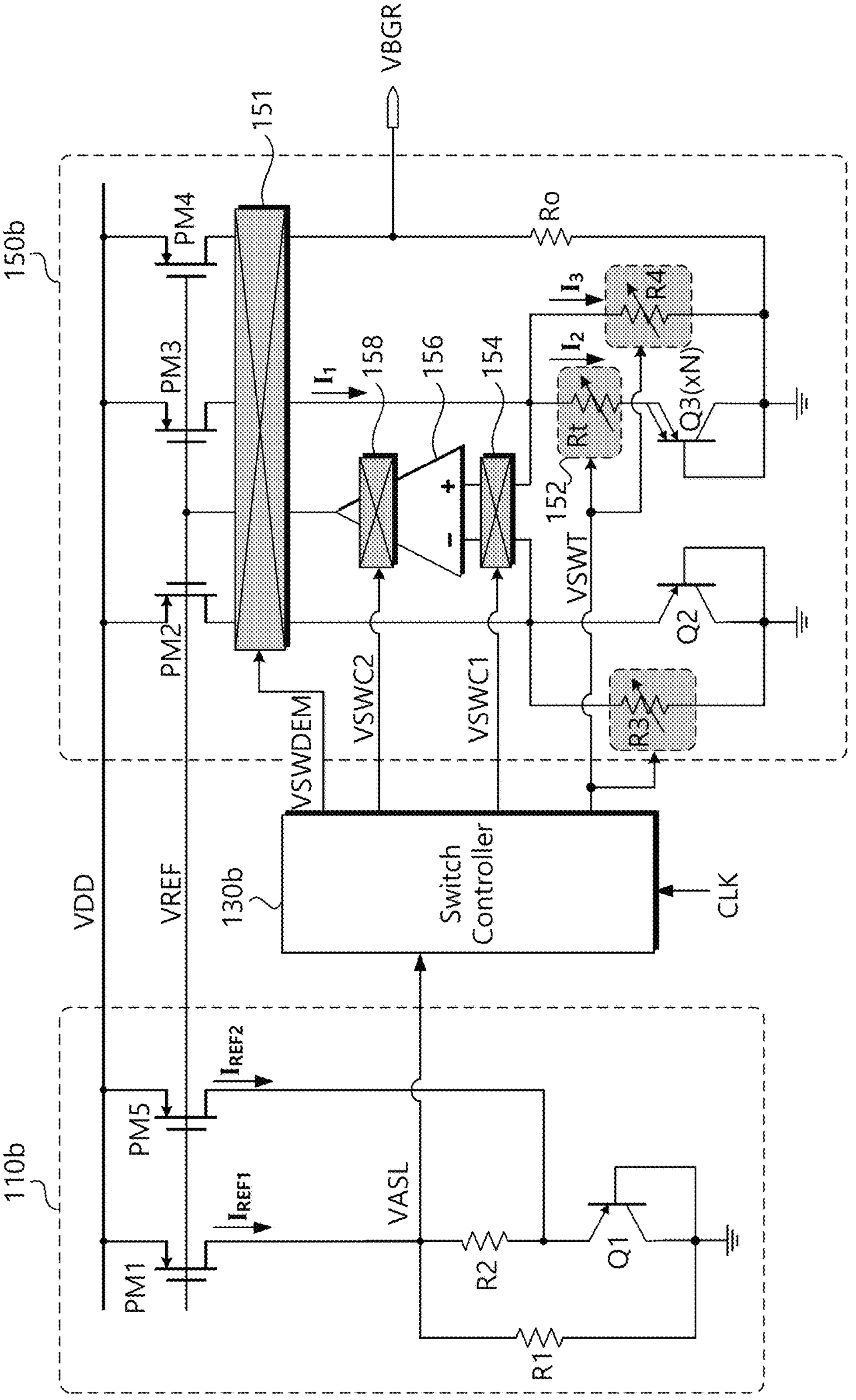
FIG. 10 is a circuit diagram showing a bandgap reference generator using a switch control voltage generator according to some example embodiments of the inventive concepts.

FIG. 10 is a circuit diagram showing a bandgap reference generator using a switch control voltage generator according to some other example embodiments of the inventive concepts. Referring to FIG. 10, the bandgap reference generator 150*b* may perform switching, chopping, or trimming of various devices using the adaptive switch level voltage VASL generated from the switch control voltage generator 110*b*. The switch control signals VSWDEM, VSWT, VSWC1, and VSWC2 for switching, chopping, or trimming are generated by the switch controller 130*b* based on the adaptive switch level voltage VASL.

The switch control voltage generator 110*b* includes PMOS transistors PM1 and PM5, a bipolar junction transistor Q1, and a first resistor R1 and a second resistor R2. The switch control voltage generator 110*b* generates an adaptive switch level voltage VASL using the base-emitter voltage VBE of the bipolar junction transistor Q1. The circuit structure of FIG. 7 including two current sources is shown as an example of the switch control voltage generator 110*b*, but the inventive concepts are not limited thereto. That is, it will be appreciated that in some example embodiments the switch control voltage generator 110*b* may be replaced by the switch control voltage generator 110*a* of FIG. 4 having a single current source.

The switch controller 130*b* generates switch control signals VSWDEM, VSWT, VSWC1 and VSWC2 using the clock signal CLK and the adaptive switch level voltage VASL. The switch control signals VSWDEM, VSWT, VSWC1, and VSWC2 are supplied to the dynamic element matching circuit 151 of the bandgap reference generator 150*b*, the trimming circuit 152 or the chopping circuits 154 and 158, and the elements R3, R4, PM2, PM3, and PM4 connected to the bipolar junction transistors Q2 and Q3. The dynamic element matching circuit 151, the trimming circuit 152, the chopping circuits 154 and 158, and the elements R3, R4, PM2, PM3, and PM4 may include digitally driven low voltage transistors.

The switch controller 130*b* may switch the dynamic element matching circuit 151 using the element matching signal VSWDEM. The dynamic element matching circuit 151 periodically cycles outputs of the PMOS transistors PM2, PM3, and PM4 that operate as current sources through mirroring. For example, the dynamic element matching circuit 151 may switch the drain of the PMOS transistor PM2 to be connected to the side of the trimming circuit 152 rather than to the bipolar junction transistor Q2. Also, the dynamic element matching circuit 151 may switch to connect the drain of the PMOS transistor PM3 to the side of the output resistance Ro instead of the trimming circuit 152. Also, the dynamic element matching circuit 151 may switch the drain of the PMOS transistor PM4 to be connected to the side of the bipolar junction transistor Q2 instead of the output resistor Ro. This switching may be repeated according to a desired (and/or alternatively predetermined) period. The PMOS transistors PM2, PM3, and PM4 by the dynamic element matching circuit 151 may maintain the same magnitude of currents provided through mirroring through a dynamic element matching action. Further to the device matching operation, the switch controller 130*b* may perform switching for chopping or trimming of the bandgap reference generator 150*b*.

The bandgap reference generator 150*b* may include the dynamic element matching circuit 151 as well as the components of FIG. 9. By reducing the offset of currents mirrored by the switching of the dynamic element matching circuit 151, a bandgap reference voltage VBGR having high reliability even when the temperature changes is generated.

The structure of the bandgap reference generator 150*b* performing dynamic device matching, chopping, and trimming using an adaptive switch level voltage VASL according to some example embodiments of the inventive concepts has been briefly described. The dynamic element matching circuit 151, the chopping circuits 154 and 158, the trimming circuit 152, and various elements R3, R4, PM2, PM3, and PM4 including the low-voltage transistor may be switched using the adaptive switch level voltage VASL having a higher level than the base-emitter voltage VBE and a slope with respect to temperature greater than that of the base-emitter voltage VBE. Therefore, according to the inventive concepts, it is possible to secure the reliability of dynamic element matching, trimming, and chopping operations of the bandgap reference generator 150*b*.

One or more of the elements disclosed above may include or be implemented in processing circuitry such as hardware including logic circuits; a hardware/software combination such as a processor executing software; or a combination thereof. For example, the processing circuitry for example may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, an application-specific integrated circuit (ASIC), etc.

The example embodiments described for carrying out the inventive concepts should not be construed as limiting. In addition to the above-described embodiments, the inventive concepts may include simple design changes or easily changeable embodiments. The inventive concepts will include techniques that can be easily modified and implemented using the embodiments. Therefore, the scope of the inventive concepts should not be limited to the above-described embodiments, and should be defined by the claims and equivalents of the claims as well as the claims to be described later.

What is claimed is:

1. A semiconductor device, comprising:
a bandgap reference generator configured to generate a reference voltage;
a switch control voltage generator configured to generate a first reference current based on the reference voltage, and generate an adaptive switch level voltage by distributing the first reference current to a first path and a second path, the first path including a first resistor, and the second path including a second resistor and a first bipolar junction transistor connected in series; and
a switch controller configured to generate a switch control signal for controlling switches included in the bandgap reference generator based on the adaptive switch level voltage,
wherein the adaptive switch level voltage has a slope with respect to temperature that is greater than a base-emitter voltage of the first bipolar junction transistor.

2. The semiconductor device of claim 1, wherein the switch control signal comprises a first switch control signal and a second switch control signal,
the bandgap reference generator comprising:
a first transistor configured to mirror and generate a first current in response to the reference voltage;
a second bipolar junction transistor configured to receive the first current and generate a first base-emitter voltage;
a second transistor configured to mirror and generate a second current in response to the reference voltage;
a trimming circuit configured to have a resistance value set according to the first switch control signal;
a third diode-connected bipolar junction transistor connected in series between the trimming circuit and ground, the third diode-connected bipolar junction transistor configured to generate a second base-emitter voltage;
an amplifier connected to the first base-emitter voltage, and connected to the second base-emitter voltage through the trimming circuit; and
a chopping circuit configured to chop the first base-emitter voltage and the second base-emitter voltage in response to the second switch control signal to provide a chopped voltage, and transfer the chopped voltage to an input terminal of the amplifier.

3. The semiconductor device of claim 2, wherein the bandgap reference generator comprises:
resistance elements configured to respectively bias the second bipolar junction transistor and the third diode-connected bipolar junction transistor; and
a dynamic element matching circuit configured to periodically cycle output currents of the first transistor and the second transistor,
wherein the trimming circuit, the chopping circuit, the resistance elements, and the dynamic element matching circuit include low voltage transistors as switches having a withstand voltage of 0.95V.

4. The semiconductor device of claim 1, wherein the switch control voltage generator includes a first PMOS transistor having one end connected to a power supply voltage, the first PMOS transistor configured to transfer the first reference current to a first node based on the reference voltage,
wherein the first resistor is connected between the first node and ground, and the first bipolar junction transistor connected in series with the second resistor are connected between the first node and ground.

5. The semiconductor device of claim 4, wherein the slope of the adaptive switch level voltage is adjusted based on a resistance of the second resistor.

6. The semiconductor device of claim 4, wherein the switch control voltage generator comprises a second PMOS transistor having one end connected to the power supply voltage, the second PMOS transistor configured to supply a second reference current to an emitter terminal of the first bipolar junction transistor based on the reference voltage.

7. The semiconductor device of claim 6, wherein the second reference current is set to ¼ of the first reference current.

8. The semiconductor device of claim 1, wherein the adaptive switch level voltage is greater than the base-emitter voltage at a first temperature by a first voltage difference, and greater than the base-emitter voltage at a second temperature higher than the first temperature by a second voltage difference,
wherein the second voltage difference is greater than the first voltage difference.

9. A switch control voltage generator, comprising:
a first current source connected to a power supply voltage, the first current source configured to transfer a first reference current having a constant level with respect to temperature to a first node;
a first resistor connected between the first node and ground;
a second resistor having one end connected to the first node;
a diode-connected bipolar junction transistor connected between another end of the second resistor and ground; and
a second current source connected to the power supply voltage, the second current source configured to apply a second reference current to an emitter terminal of the diode-connected bipolar junction transistor,
wherein the first resistor, the second resistor and the diode-connected bipolar junction transistor are configured to generate an adaptive switch level voltage at the first node, and a magnitude of a slope and an offset of the adaptive switch level voltage with respect to temperature being adjustable based on resistances of the first and second resistors.

10. The switch control voltage generator of claim 9, wherein a temperature complementary current flows through the first resistor and a temperature proportional current flows through the second resistor.

11. The switch control voltage generator of claim 9, wherein the first current source includes a first transistor configured to supply the first reference current through mirroring from the power supply voltage based on a reference voltage provided from a bandgap reference generator.

12. The switch control voltage generator of claim 11, wherein the diode-connected bipolar junction transistor is a PNP-type transistor having a base terminal and a collector terminal connected to ground.

13. The switch control voltage generator of claim 9, wherein the adaptive switch level voltage is greater than a base-emitter voltage of the diode-connected bipolar junction transistor at a first temperature by a first voltage difference, and greater than the base-emitter voltage at a second temperature higher than the first temperature by a second voltage difference,
wherein the second voltage difference is greater than the first voltage difference.

14. The switch control voltage generator of claim 13, wherein a slope of the adaptive switch level voltage with respect to temperature is greater than the base-emitter voltage with respect to temperature.

15. The switch control voltage generator of claim 9, wherein the second current source is configured to directly supply the second reference current to the emitter terminal of the diode-connected bipolar junction transistor, and the second reference current has a constant magnitude with respect to temperature.

16. The switch control voltage generator of claim 15, wherein the magnitude of the second reference current is smaller than a magnitude of the first reference current.

17. The switch control voltage generator of claim 9, wherein the adaptive switch level voltage is provided as a switch voltage of a trimming circuit or a chopping circuit of a bandgap reference generator.

18. A method for generating a switch voltage for switching of a bandgap reference generator, comprising:

generating a reference current based on a reference voltage provided from the bandgap reference generator;

generating an adaptive switch level voltage by distributing the reference current to a first path and a second path, the first path including a first resistor, and the second path including a second resistor and a diode-connected bipolar junction transistor connected in series;

generating a switch control signal for controlling switch elements of the bandgap reference generator based on the adaptive switch level voltage; and applying the switch control signal to the switch elements of the bandgap reference generator.

19. The method of generating a switch voltage of claim 18, further comprising setting a resistance of the second resistor so that the adaptive switch level voltage has a slope with respect to temperature greater than a base-emitter voltage of the diode-connected bipolar junction transistor.

20. The method of generating a switch voltage of claim 18, wherein the switch elements include at least one of a dynamic element matching circuit, a chopping circuit, and a trimming circuit, and the switch elements each include a low voltage transistor having a withstand voltage of 0.95V that perform switching in response to the switch control signal.

* * * * *